United States Patent
Frivik et al.

(10) Patent No.: US 8,021,080 B2
(45) Date of Patent: Sep. 20, 2011

(54) CONTAINERIZED GEOPHYSICAL EQUIPMENT HANDLING AND STORAGE SYSTEMS, AND METHODS OF USE

(75) Inventors: Svein Arne Frivik, Oslo (NO); Rune Voldsbekk, Drammen (NO); Ottar Kristiansen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 485 days.

(21) Appl. No.: 11/740,788

(22) Filed: Apr. 26, 2007

(65) Prior Publication Data

US 2008/0267009 A1    Oct. 30, 2008

(51) Int. Cl.
*F16L 1/12* (2006.01)

(52) U.S. Cl. ................ 405/166; 405/158; 405/168.4

(58) Field of Classification Search ........... 405/158, 405/166, 168.3, 168.4
See application file for complete search history.

(56) References Cited

U.S. PATENT DOCUMENTS

| | | | |
|---|---|---|---|
| 2,924,328 A | 2/1960 | Lidderdale | |
| 2,973,919 A | 3/1961 | Goldrick et al. | |
| 3,093,333 A * | 6/1963 | Bishop | 242/386 |
| 3,440,991 A | 4/1969 | Cubbage | |
| 3,602,730 A * | 8/1971 | Cushing | 307/150 |
| 3,658,222 A | 4/1972 | Dressel et al. | |
| 3,843,096 A | 10/1974 | Wilson et al. | |
| 3,975,980 A | 8/1976 | Hood | |
| 4,010,619 A | 3/1977 | Hightower et al. | |
| 4,570,245 A | 2/1986 | Thigpen | |
| 4,581,723 A | 4/1986 | Savit | |
| 4,756,270 A | 7/1988 | Boscov | |
| 4,828,223 A | 5/1989 | Russell et al. | |
| 5,013,186 A | 5/1991 | Kakizaki | |
| 5,080,530 A * | 1/1992 | Crawford et al. | 405/163 |
| 5,284,323 A * | 2/1994 | Pawkett | 254/134.3 SC |
| 5,369,884 A | 12/1994 | Chen | |
| 5,488,920 A | 2/1996 | Gjestrum | |
| 5,624,207 A | 4/1997 | Berges | |
| 5,655,753 A | 8/1997 | Berges et al. | |
| 5,902,072 A | 5/1999 | Berges | |
| 6,021,091 A | 2/2000 | Gaiser | |
| 6,216,627 B1 | 4/2001 | Johnsen et al. | |
| 6,382,124 B1 | 5/2002 | Williamson | |
| 6,588,980 B2 * | 7/2003 | Worman et al. | 405/158 |
| 2002/0172562 A1 * | 11/2002 | Worman et al. | 405/161 |
| 2003/0223822 A1 * | 12/2003 | Oldervoll et al. | 405/158 |
| 2004/0068373 A1 | 4/2004 | Goujon et al. | |

(Continued)

FOREIGN PATENT DOCUMENTS

EP    1 279 621 A1    1/2003

(Continued)

OTHER PUBLICATIONS

Caldwell, "Shear waves shine brightly," *Oilfield Review*, 2:2-15, 1999.

(Continued)

*Primary Examiner* — Frederick L Lagman

(57) ABSTRACT

Systems and methods for marine seismic cable deployment and retrieval are described. One system comprises a plurality of portable containers, each container temporarily storing a marine seismic component, at least some of the containers able to be removably fastened to a deck of a vessel of opportunity, and at least one of the portable containers storing a main cable winch on which is wound a marine seismic cable. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

30 Claims, 2 Drawing Sheets

U.S. PATENT DOCUMENTS

| | | | |
|---|---|---|---|
| 2005/0052951 A1* | 3/2005 | Ray et al. | 367/188 |
| 2005/0276665 A1* | 12/2005 | Entralgo et al. | 405/190 |
| 2006/0256661 A1 | 11/2006 | Goujon et al. | |
| 2006/0276992 A1 | 12/2006 | Berg et al. | |
| 2007/0248417 A1* | 10/2007 | Berg | 405/158 |
| 2007/0291587 A1 | 12/2007 | Gros | |

FOREIGN PATENT DOCUMENTS

| | | |
|---|---|---|
| GB | 2 210 355 A | 7/1989 |
| GB | 2 345 683 | 7/2000 |
| WO | WO 97/10461 | 3/1997 |
| WO | 2005-010316 A2 | 2/2005 |
| WO | 2008-144113 A3 | 4/2010 |

OTHER PUBLICATIONS

George, "Shape of things to come: PGS's revolutionary Ramform seismic ship," Offshore, 5:45-50, 1994.

International Preliminary Report on Patentability for PCT / US2008 / 058920; issued Mar. 2, 2010.

* cited by examiner

CONTAINERIZED GEOPHYSICAL EQUIPMENT HANDLING AND STORAGE SYSTEMS, AND METHODS OF USE

BACKGROUND OF THE INVENTION

1. Field of Invention

The present invention relates to the field of handling and storage systems for marine seismic data acquisition cables, and methods of deploying seismic cables and other equipment using same. More specifically, the invention relates to containerized, compact, portable or semi-portable seismic cable handling and storage systems.

2. Related Art

Currently used handling systems for seismic cables are large and expensive constructions mounted on a purpose built vessel. The systems have little flexibility and are designed to fit the purpose of a particular vessel. If the system is to be moved from one area to another, the vessel must move also, or if the system must be moved to another vessel, rebuilding is needed both of vessel and the handling system. This is a time-consuming exercise as well as an expensive operation. While there have been efforts to move away from purpose built vessels toward modular seismic cable handling systems contained in knockdown intermodal freight containers, further improvement and flexibility in design is required. Today's methodology is very inefficient in handling marine seismic equipment, especially in shallow water.

In many seismic operations, and in particular for ocean bottom seismic operations (including those employing two-component and four-component seabed seismic sensors) vessels are rigged to conduct a specific job or survey. In such case it would be better to have a compact system that is easily rigged and would fit on a vessel of opportunity rather on a purpose built ship. With vessel of opportunity we mean (but are not limited to) supply vessel, ferries and/or barge. In other cases for instance like in the Caspian Sea, not all vessels are able to get in and hence access the area. In such cases a compact, cargo transportable system is needed.

Alternate handling systems for seismic cables and methods that would not depend on purpose built vessels would be beneficial. The systems and methods of the present invention address the above problems.

SUMMARY OF THE INVENTION

In accordance with the present invention, seismic cable handling and storage systems and methods of use are described which provide a compact and flexible solution to the problem of large, expensive, purpose vessel built systems.

A first aspect of the invention is a system comprising:
(a) a plurality of portable containers, each container temporarily storing one or more marine seismic components, at least one of the seismic components being a marine seismic receiver cable (which may be a seabed seismic cable, or a marine seismic streamer), the other marine seismic components sufficient to deploy and retrieve the seismic cable, and at least some of the containers able to be removably fastened to a deck of a vessel of opportunity;
(b) at least one of the portable containers storing a main cable winch on which is wound a marine seismic receiver cable.

As used herein the term "vessel of opportunity" means a vessel engaged in marine seismic activities that is normally and substantially involved in activities other than marine seismic activities and not a vessel carrying seismic equipment as a primary cargo. In certain systems of the invention, the portable containers may be standard cargo containers; in certain systems of the invention the marine seismic components in one or more containers may be in a disassembled state, and thus smaller than the actual internal capacity of the container, so that all seismic components may be able to fit into the containers for transport. Certain systems of the invention may be in the form of a kit, wherein some of the seismic components may be assembled outside the containers, after the containers are loaded onto the vessel, but in general the inventive systems may be operational from the containers. As used herein "marine seismic component" means components selected from, but not limited to: marine seismic receiver cables, other cables (for example distance ropes), over the board units, cable tension machines, additional cable winches (for example of varying sizes and powers), cable storage winches, a hydraulic system, a control system, spooling devices, power systems, a multi-vessel communication system, a workshop container, and the like, all fitting on a vessel of opportunity. The only requirements for the installation of systems of the invention on a vessel of opportunity are that the vessel may take the payload of the inventive system or kit, as well as having deck space for installing the system. Systems of the invention are scaleable and may hence be optimized according to the specific job/survey. Vessels of opportunity may be selected from, but not limited to, supply vessels, ferry vessels, barges, and the like. The inventive systems by design are modular and may be scaled according to given operation, like cable length, water depth, and the like.

Systems and kits of the invention are fully modular and compact, and may be suitable for marine seismic sources cables, marine seismic streamers, and may be particularly suitable for ocean bottom cable seismic cable handling systems. The inventive systems may be made so that for all purposes they fit in standard cargo containers. This feature makes the inventive systems easy to handle, ship and install on non-seismic vessels as long as the back deck of the vessel fits the footprint of the system. Suitable back deck area may range from about 150 to about 400 square meters. Systems of the invention may be installed generally anywhere on the deck of a vessel of opportunity in order to get the cable into or out of the sea. For example, in some embodiments, the system may be installed on the side of the vessel deck. In other embodiments an inventive system may be mounted on the bow of the vessel.

Systems of the invention may deploy and retrieve seismic cable on to a set of main winches, or to storage reels if spooling is required. The cables may be shipped to the vessel in reel storage containers or via other shipping devices. On the vessel the cables may be spooled onto the main winch before deployment on to the seafloor for seismic recording. The inventive systems are fast, able to retrieve and deploy cable up to 3 m/s.

Systems of the invention may comprise a cable tension machine, which may be selected from a linear tension machine, a capstan, a belt, a set of wheel pairs, and combinations thereof. The cable tension machine may be selected based on the operational water depth as well as other parameters driving the overboard tension.

Systems of the invention may comprise a damper device made such that it fits in one or more containers as it is transported. The damping device is used to spool cable from a main winch to the cable tension machine, but may also be used to spool cable on and off storage reels The damping device is the link for the seismic cable between the other machines, and therefore it may be assembled outside a container as it used in operation, though in certain embodiments, for example small operations, it may be inside a container.

The inventive systems may be operated manually, semi-automatically by one or several persons following the operation, or alternatively fully automated, with the same person(s) having the job of surveillance of system performance. The people may operate the system from a surveillance cabin or by remote control on the deck.

Systems of the invention may comprise a control system able to control cable tension between high and low (variable) tension on the seaside of the vessel, and low and constant tension onto the main winch or storage reels on the vessel side. The control system may be configured to controllably operate the overboard unit, tension machine and winches at the same time with deployment and retrieval speed of up to 3 m/s. Due to the high speeds possible, the inventive systems may have built in start-up and slow-down sequences in order to provide a soft start and stop during cable deployment and retrieval. In addition, the control system may have emergency shut-off options for emergency situations. Tension on the cable, angle of the cable vs. the stern of the vessel, speed of the cable, how much cable is deployed/retrieved, and the like, are a few of the many possible measurements made by the control system in order to achieve safe handling of the equipment as well as a safe operation for personnel involved. The control system may include a surveillance cabin for the operator to sit and run/overview the operation. The surveillance cabin may be modular in terms of where it may be placed. It may be placed on the deck or on top of one of the containers.

Systems of the invention may include a workshop container able to serve as a store for spare parts and as a workshop for cable repair.

Systems of the invention may comprise a multi-vessel communication system. Since deployment and retrieval of seismic cables is usually performed with two or more vessels there is a need for a multi-vessel communication system. Such communication system may be satellite telephone-based or more purpose built, such as assignee's communication system known under the trade designation MAST, described in assignee's published U.S. patent application no. 20060276992, published Dec. 7, 2006, incorporated herein by reference.

Certain systems of the invention may include specialized recording containers, made and put on the vessel in order to record the seismic data. Alternatively the vessel may be rigged to have such equipment in an instrument room.

Systems of the invention may be attached to the vessel deck either though welding, bolts or by other fastening means. A spill preventing system may be mounted inside the containers or underneath the components in the containers order to capture oil from the system components or seismic cable, to prevent polluting the environment.

A second aspect of the invention comprises methods of deploying a marine seismic cable from a vessel, one method comprising:
  (a) selecting a plurality of portable containers, each container temporarily storing a marine seismic component, at least one of the portable containers storing a cable winch on which is wound a marine seismic cable;
  (b) removably fastening at least some of the containers to a deck of a vessel of opportunity; and
  (c) deploying the marine seismic cable.

The systems and methods of the invention reduce or overcome problems with previous systems and methods. Systems and methods of the invention may be used to collect marine seismic data, for example 3-D and 4-D marine seismic data. The methods of the invention apply to any type of marine seismic cable.

Systems and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics may be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present invention is directed to systems and methods for deployment and/or retrieval of marine seismic cables. Various features of the inventive systems and methods are now discussed in greater detail.

Figure 1:
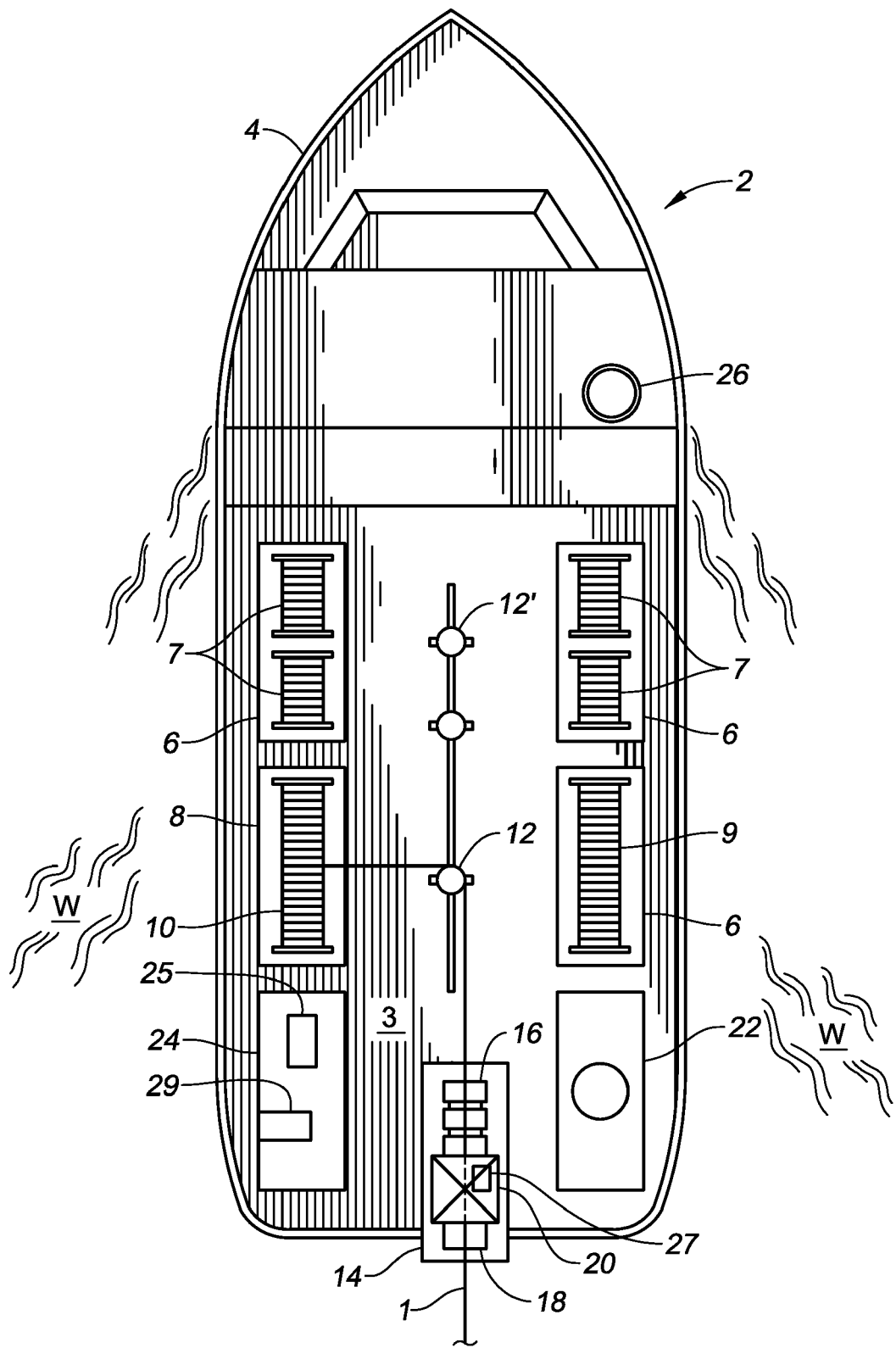
FIG. 1 illustrates a simplified schematic plan view of one system embodiment of the invention installed on a deck of a vessel of opportunity.
Figure 2:
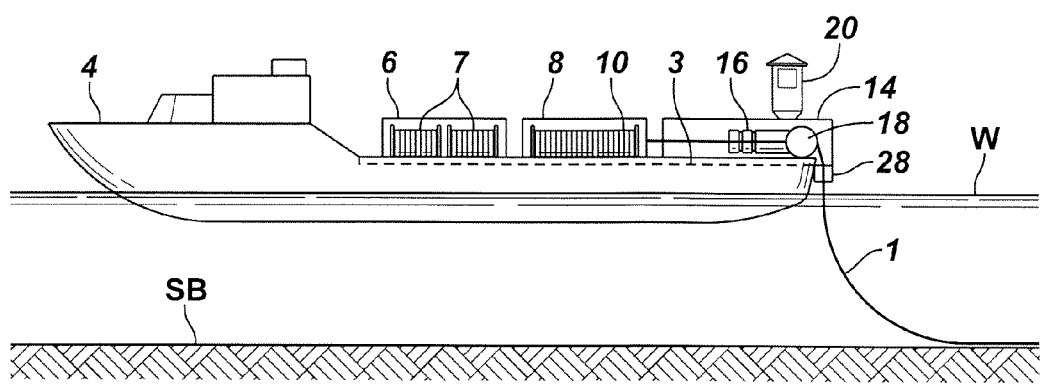
FIG. 2 illustrates a simplified side elevation view of the system of FIG. 1 installed on a vessel of opportunity.

Referring to the drawing figures, illustrated schematically in FIG. 1 is a simplified schematic plan view of a system 2 of the invention installed on a deck 3 of a vessel of opportunity 4 in a sea or other water body W, while FIG. 2 illustrates a simplified side elevation view of a back deck portion of the system of FIG. 1 dispensing cable 1 onto a seabed, SB. System 2 includes, in this embodiment, several containers 6 holding various sized reels or spools 7 and 9 of seismic cable 1. Container 8 holds a main cable winch 10, which is illustrated deploying cable 1 through a damper/cable spooler device 12. Other positions of the damper/spooler device are illustrated at 12'; alternatively, there may be several damper/ spooler devices 12, 12'. Illustrated at 14 is a container holding a cable tension machine 16 (in this embodiment a set of paired rubber wheels, as known in the art), and an overboard unit 18, in this embodiment a large rotatable wheel. Also illustrated is a surveillance cabin 20 for a human operator. The surveillance cabin 20 may include a control system 27. Overboard unit 18 may include a cable chute 28. Also illustrated is a workshop container 22 and a container 24 holding a hydraulic power unit 25 and a power system 29. A multi-vessel communication device 26 is illustrated near the bow of the vessel, although this position is not required. As may be seen in FIGS. 1 and 2, the system is compact, portable, and requires no special vessel design features other than the vessel must have available deck space and be able to handle the payload (weight) of the containers and seismic equipment therein.

Figure 3A:
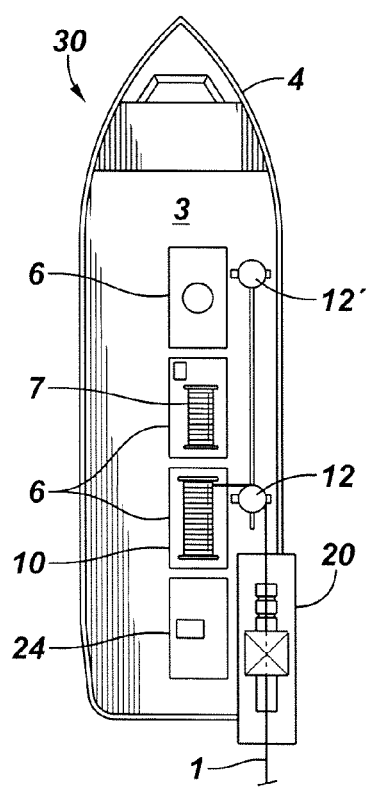
FIGS. 3A-C illustrate simplified plan views of three different system embodiments of the invention.
Figure 3B:
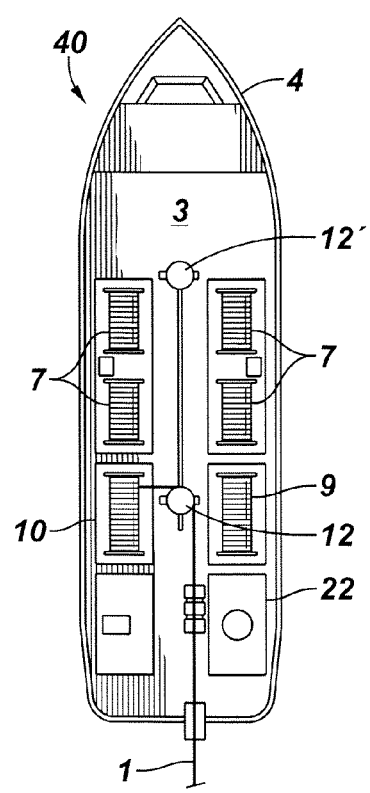
Figure 3C:
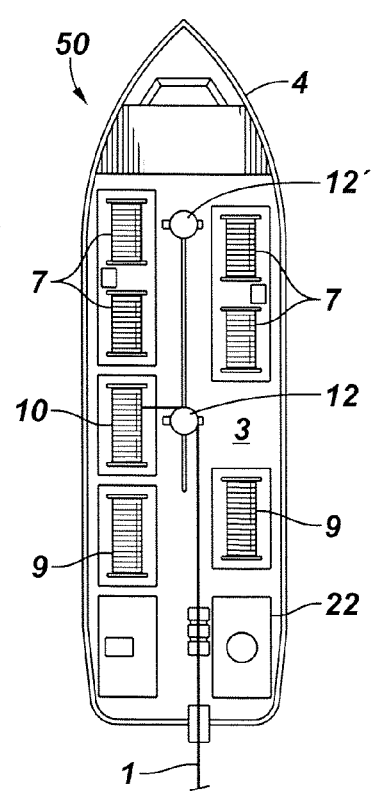

FIGS. 3A-C illustrate simplified plan views of three different systems of the invention. FIG. 3A illustrates a small system 30, FIG. 3B illustrates a larger system 40, and FIG. 3C a large system 50, exemplifying the modularity and scalability of systems of the invention. The same reference numerals are used in the various drawings figures to designate same components unless otherwise noted. In these system embodiments, no surveillance cabin is illustrated for clarity; in fact these embodiments may exemplify embodiments where remote control is employed, for example, from shore or from another vessel not illustrated. As illustrated in system 30 of FIG. 3A, note that for smaller systems of the invention the containers may be more or less centrally located near the longitudinal axis of the vessel of opportunity, while the damping/cable spooling devices 12, 12', are to one side of the vessel, in this embodiment the starboard side. In larger systems 40 and 50 of FIGS. 3B and 3C, respectively, the layout of containers is along both sides of deck 3.

Portable containers are used for systems of the invention for storage and transport of marine seismic components. In certain embodiments, the seismic equipment may be removed from some of the portable containers, however, in most embodiments the seismic equipment remains in the containers, except for the seismic cable itself during deployment and retrieval. Suitable portable containers are standard transport cargo containers, but this is not a requirement. These are essentially 8×8×20-foot (2.44×2.44×6.1-meter) ISO containers with attachment fixtures that allow the containers to be picked up by hydraulic arms. Other standard sizes are available, such as 8×8×40-foot (2.44×2.44×12.2-meter), and 8×20×40-foot (2.44×6.1×12.2-meter). Each of these modular cargo containers or fixtures can be pre-loaded with seismic equipment, loaded on a ship, plane, or truck, and transported directly from a port to an area where a marine seismic data acquisition survey is to be performed. Each of these containers may have radio beacons with bills of lading in electronic storage units that the shipper/supplier or customer/end-user can interrogate at various points of the journey to know exactly where its supplies are and redirect them in transit as needed. Even standard transport cargo containers may be modified in order to accommodate systems and methods of the invention. Modifications might involve provision of removable doors, removable walls, removable floor or removable roof, in such a way that several containers may be linked together in order to achieve the purpose of laying and retrieval of the marine seismic receiver cable. Further modifications may include inclusion of storage and transportation frames (STFs) and smaller vehicle storage and transportation frames (V-STFs). Both look like shark cages, except that they may be used to store seismic gear inside of standard shipping containers. Other sized containers may be used as necessary. The STFs may contain adjustable shelves, making it easy to store gear, and easy to see what is in each one when they are hauled out of the containers, since it is not necessary to tear open boxes to double check what's inside. The STFs may fold flat when not in use, and for easy storage.

Suitable overboard units are those that are made to fit in one or more containers; if there are several containers they are rigged together so that the equipment works as one or several linked units. The containers may be placed together in-line, side by side or on top of each other in order to fit the purpose of getting cables safe overboard the vessel and back onto the vessel.

The overboard unit functions to pull cables either from the sea bottom, or from the main cable winch safely. The overboard unit may be, but is not limited to, a wheel (with or without power), a chute or combination of these or other means of getting the cable safe overboard. In certain embodiments the systems have a measuring device to measure the angle of the cable (in a least two planes) relative to the stem of the vessel. The overboard unit may be operated from the control system described below, or, in other embodiments, directly on the machine itself.

Suitable cable tension machine is made so that it fits in one or more containers, if there are several containers they are rigged together so that the equipment works as one or several linked units. The containers may be placed together in-line, side by side or on top of each other in order to fit the purpose of getting the cable safe overboard the vessel. The cable tension machine may be, but is not limited to, a linear tension machine, a capstan, a belt, a set of wheel pairs (sometimes referred to as a squirter), or combination of these. The machine is selected based on the operational water depth as well as other parameters driving the overboard tension. In some cases it may be necessary to combine different machines in order to fit the purpose of getting the cable safe overboard or onboard the vessel. The systems and methods of the present invention are not limited in combination of such machines. As an example, in certain embodiments one may combine a belt with a capstan, where the belt is used to create friction on the capstan. This is highly desirous in shallow water operations where there is frequently low tension on the cable at the stem of the vessel (on the seaside). The cable tension machine may be operated from the control system described below, or, in other embodiments, directly on the machine itself.

Portable containers useable in the systems and methods of the invention may be attached to the vessel of opportunity deck, and one or more spill preventing sub-systems may be mounted underneath winches, cable tension machines, and the like, in order to capture oil from the system components or the seismic cable in order to not pollute the environment.

The main cable winches are made to fit in containers during transport. Since the flanges of the drums are big in order to facilitate the huge amount of cable, these might be taken out of the container in order to run them most efficiently, but there might be situations where the main winches might be run from within the container. The main cable winch, as well as all other components in the system, may either be driven hydraulically, electrically, diesel fuel, or air driven. In order to get the huge cable winches into a container the flanges of the drums may be made in several pieces which may then be either bolted, hitch, or welded on the drum during installation. In order to obtain the stiffness required of such flanges, extra support might be used. The main cable winches may be operated from the control system described below, or, in other embodiments, directly on the winch itself. The level winder may be diamond or servo, while the digital instrumentation readouts may be supplied for speed, length, and cable tension.

The cable winches may be manual, semi-automatic, automatic, computer controlled. The main cable winches main be motion compensated, and may run at speeds up to about 2-3 m/sec, pulling loads ranging from about 50-10,000 Kg. Suitable main cable winches may be constructed from steel, steel alloy, aluminum, or composite materials.

The cable storage reels are smaller winches that fit in standard containers. There may be one or several such reels in one container. The purpose of the container is to store cables that are not in use on each deployment/retrieval. There may be one or several motors (electrical or hydraulic) to operate the cable storage reels in the container. The cable storage reels may be operated from the control system described below, or, in other embodiments, directly on the machine itself. Suitable cable reels attach to the vessel deck and a spill preventing system may be mounted underneath the storage reel(s) in order to capture oil from the system or seismic cable in order to not pollute the environment.

Suitable damper/cable spooling devices are those that fit in one or more containers during transported. Since the damping device is the link for the seismic cable between the other machines it needs to be assembled outside a container as it used in operation, although in certain embodiments, for example small operations, it may be inside a container. The damper/cable spooling device is primarily used to spool cable from the main cable winch to the cable tension machine, but may also be used to spool cable on and off cable storage reels. Suitable damper/cable spooling devices are constructed so that it may take changes in tension due to irregularities in the seismic cable as it is run in 90° or 180° turns.

The systems and methods of the invention also employ a containerized power pack and power generator, which may be hydraulic, electric, diesel, or air driven. This supplies the system with the necessary power to operate the various system components. The power pack and power generator may be operated and monitored by the control system described herein. The power pack and power generator is attached to the vessel deck and a spill preventing system may be mounted underneath the unit in order to capture oil from the system or seismic cable in order to not pollute the environment. In some embodiments there may be need for extra electrical power on the vessel in order to facilitate operation of all system components. In such embodiments, one may either have a container with combined electrical power generation and hydraulic power, or they may be supplied in two separate containers.

Systems and methods of the invention comprise a control system, which may be supplied in a surveillance cabin. Suitable control systems may be operated manually, semi-automatically by one or several persons following the operation, or alternatively fully automated, with the same person(s) having the job of surveillance of system performance. The personnel may operate the system from a surveillance cabin or by remote control on the deck. The control system may be engineered to enable high and low (variable) tension on the seaside of the vessel and low and constant tension onto the main winch or storage reels on the vessel side. The control system enable an operator to run the overboard unit, tension machine and winches at the same time with cable deployment and retrieval speed of up to 3 m/s. Due to the high cable deployment and retrieval speeds possible with the systems of the invention, the inventive systems may have built-in start-up and slow-down sequences in order to give a soft start and stop of the deployment/retrieval. In addition, systems of the invention may have fast stop options for emergency situations. Tension on the cable, angle of the cable vs. the stem of the vessel, speed of the cable, how much cable is deployed/retrieved, and the like, are a few of many measurements that may be made by the control system in order to achieve safe handling of the equipment as well as a safe operation for personnel involved. The control system may be provided with a surveillance cabin for the operator to sit and run/overview the operation. The surveillance cabin, if provided, may be modular in terms of where it may be placed. It may be placed on the deck or on top of one of the containers.

Certain systems of the invention may comprise a workshop within a workshop container. The workshop container may comprise, but is not limited to, a store for spare parts and a workshop for cable repair.

Systems of the invention may include a multi-vessel communication sub-system. This may be particularly beneficial when deploying and retrieving ocean bottom seismic cable, as these operations usually are performed with two or more vessels. In these situations, there is a need for multi-vessel communication. Such communication systems may be satellite telephone-based, or more purpose built, such as the proprietary multi-vessel communication system known under the trade designation MAST, discussed in assignee's published U.S. patent application number 20060276992, published Dec. 7, 2006, previously incorporated herein by reference.

Seismic receiver cables useful in systems and methods of the invention may be ocean bottom seismic cables, marine seismic streamers, and/or other marine seismic cables, such as cables used to tow marine seismic sources, deflectors, buoys, and the like. Older ocean bottom cables were comprised only of a hydrophone and a vertically oriented geophone strapped to the outside. More recent versions of seismic seabed cables typically comprise an instrumented cable packed with receivers in so-called "active sections", similar to the streamers that are towed in conventional marine surveys, but designed to operate on the seafloor. One seabed cable, known under the trade designation "NESSIE 4C", available from WesternGeco L.L.C., contains multiple sensing units each containing one hydrophone and three orthogonally oriented geophones inside the cable, distributing their weight for optimal coupling to the seafloor. This design was an improvement over the older ocean bottom cables. Other seabed seismic cable designs comprise separate support and signal cables, which help to acoustically decouple the sensors from the support cable. The function of support cable and seismic cable are sometime included in a single construction during the manufacture of the cable, and signal leads in this type of cable may be exposed and connected to sensors units.

Seabed seismic cables useful in the invention include those described in the article "Shear Waves Shine Brightly", Oilfield Review, pages 2-15 (1999), and typically comprise an instrumented cable packed with receivers, similar to the streamers that are towed in conventional marine surveys, but designed to operate on the seafloor. One seabed seismic cable, known under the trade designation "NESSIE 4C", used in the seabed seismic survey system known under the trade designation "Q-Seabed" (WesternGeco), contains multiple sensing units each containing one hydrophone and three orthogonally oriented geophones inside the cable, distributing their weight for optimal coupling to the seafloor. Each cable may house hundreds of four-component sensors. Full particle-motion vector recording of all P (pressure) and S (shear) wavefronts may be achieved, along with the pressure wavefront familiar from towed streamers. This design was an improvement over conventional ocean bottom cables, which may be employed in the present invention as well, comprising only a hydrophone and a vertically oriented geophone strapped to the outside; however, this arrangement is incapable of recording the full particle-motion vector and may not couple adequately to the seafloor. Published United States patent application number 20040068373, published Apr. 8, 2004, assigned to WesternGeco L.L.C., and incorporated by reference herein, describes a seabed sensor unit and support cable that may have improve coupling to the seabed. The sensor unit may comprise one or more sensing elements disposed within a protective housing having a flat base. A flat base ensures that there is an adequate contact area between the sensor housing and the earth's surface, so that there is good acoustic coupling to the sensing element(s) mounted within the sensor housing. The housing may be attached to a support cable. Furthermore, the dimensions of the base of the housing may be chosen so that the extent of the base in a direction parallel to the cable is similar to the extent of the base in a direction perpendicular to the cable, which may minimize the dependence of the acoustic coupling to the sensor housing, and thus to sensing elements within the housing, on the angle between the incident seismic energy and the cable.

Seabed seismic cables useful in the invention may employ various fairings, such as so-called hairy fairings described in assignee's co-pending U.S. application Ser. No. 11/128,044, filed May 12, 2005, incorporated by reference herein for its teaching of various seabed seismic cable varieties. Fairing may be used on either or both active sections and jumper sections. Hairy fairing may comprise undulating strands of material, which may flap up, down and all around under strong current, much like strands of string in a strong wind, or the tail of a kite. The strands may be attached separately, after manufacture of the seismic cable, or they may be loosened from the skin of the cable, which might be a braided material. Seabed seismic cables of the invention may have circular grooves or channels in the cable skin, or in a sleeve around the cable skin. Alternatively, the channels may be part of a helical groove.

Seabed seismic cables useful in the invention may have an exterior surface shape that defines a plurality of shaped channels formed in the cable in the crossline (y) direction. The exterior shape of the cable, including channels, creates multiple paths for fluid to travel between the cable and the seabed substantially in the crossline direction. The width and depth of the channels or other shape perturbations may be uniform or non-uniform from channel to channel, and channels may be spaced uniformly or non-uniformly along cable in the inline, or (x) direction. Furthermore, channels need not extend the entire circumference around the cable. Channels are not limited to any particular shape, cross-section, length, width, depth, or volume.

Other seabed seismic cables useful in the invention may comprise members such as pointed cones protruding from the exterior surface of the cable. Either or both active and jumper cable sections may employ these features. Other possible shapes for the protruding members include pyramids, such as 3-sided or 4-sided pyramids, although the shape is not limited to any of these shapes, and more than one shape may be used on any cable, or similar shapes but having a variety of sizes may be used. The protruding members dig into the seabed, while other members are shown as being on a substantially impervious portion of the seabed, perhaps a rocky outcropping. In certain embodiments, protruding members have a double function of providing channels between members, and substantially reducing rolling and translational movement of cables on seabed in the crossline direction. Fairing elements may be added to these embodiments as well, thus introducing the vortex shedding function, as well as providing channels between cables and seabed and a motion reducing function.

Fairing elements, if used, may be manufactured during the manufacture of the cable, or added afterwards. Methods of making cables having fairing elements, such as braided hair faired cables, are not the subject of the invention, these methods being known from publications such as U.S. Pat. Nos. 3,440,991; 3,975,980, and 4,756,270. Another seabed cable useful in the invention is described in U.S. Pat. No. 6,021,091, also assigned to WesternGeco, L.L.C., which describes an elongated ocean-bottom seismic cable section of a desired length manufactured by assembling a stress member in combination with a plurality of signal communication channels. A plurality of receiver clusters is fastened to the assembly at desired intervals.

Systems, kits, and methods of use of the invention allow operators to put seismic handling equipment in containers together with the cables in storage, providing more flexibility and user-friendliness of such equipment in order to deploy/retrieve seismic equipment from the sea, resulting in more efficient rigging and handling of the seismic equipment Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A system, comprising:
   a vessel; and
   a plurality of portable containers removably disposed on a deck of the vessel, wherein the portable containers comprise:
   a winch;
   a marine seismic cable wound around the winch; and
   one or more marine seismic components for deploying and retrieving the marine seismic cable, wherein at least one of the marine seismic components is a cable tension machine.

2. The system of claim 1, wherein the portable containers are cargo containers.

3. The system of claim 1, wherein some of the marine seismic components are transported disassembled, and are subsequently assembled outside the portable containers, after the portable containers are loaded onto the vessel.

4. The system of claim 1, wherein the system is operational from the portable containers after the marine seismic components are installed on the vessel.

5. The system of claim 1, wherein the marine seismic components comprise over board units, additional cable winches, cable storage winches, a hydraulic power unit, a control system, cable spooling devices, a power system, a multi-vessel communication system, a workshop container or combinations thereof.

6. The system of claim 1, wherein the vessel is able to take the payload of the system and has a deck space for installing the system.

7. The system of claim 1, wherein the vessel is a supply vessel, a ferry vessel, or a barge.

8. The system of claim 1, wherein the marine seismic receiver cable is a marine seismic streamer or an ocean bottom seismic receiver cable.

9. The system of claim 1, having a footprint ranging from about 150 to about 400 square meters.

10. The system of claim 1, wherein the portable containers are removably coupled on a side of the vessel deck, on a bow of the vessel, or on a back deck of the vessel.

11. The system of claim 1, wherein the winch is used to deploy and retrieve the marine seismic cable.

12. The system of claim 1, further comprising a plurality of storage reels for spooling the marine seismic cable.

13. The system of claim 1, wherein some of the portable containers are reel storage containers, on which some of the marine seismic cable is wound.

14. The system of claim 1, further comprising a modular surveillance cabin for a human operator to sit and run/overview a cable deployment and/or retrieval operation, wherein the surveillance cabin is placed on the deck of the vessel or on top of one of the portable containers.

15. The system of claim 1, further comprising a workshop container configured to store spare parts and serve as a workshop for cable repair.

16. The system of claim 1, further comprising a multi-vessel communication system.

17. The system of claim 1, wherein one of the portable containers is a portable recording container comprising seismic data recording equipment.

18. The system of claim 1, wherein the marine seismic cable is spooled onto the winch before deployment on to the seafloor for seismic recording.

19. The system of claim 1, wherein the vessel is a vessel of opportunity.

20. A system, comprising:
a vessel; and
a plurality of portable containers removably disposed on a deck of the vessel, wherein the portable containers comprise:
a winch;
a marine seismic cable wound around the winch;
one or more marine seismic components for deploying and retrieving the marine seismic cable; and
a cable tension machine, wherein the cable tension machine comprises a linear cable tension machine, a capstan, a belt, a set of wheel pairs, or combinations thereof.

21. The system of claim 20, further comprising a damping device made such that it fits in the portable containers for transport, wherein the damping device is used to spool the marine seismic cable from the winch to the cable tension machine.

22. A system, comprising:
a vessel; and
a plurality of portable containers removably disposed on a deck of the vessel, wherein the portable containers comprise:
a winch;
a marine seismic cable wound around the winch;
one or more marine seismic components for deploying and retrieving the marine seismic cable; and
a control system for variably controlling cable tension on a seaside of the vessel, for controlling cable tension onto the winch or one or more storage reels on a vessel side, or combinations thereof.

23. A method of deploying a marine seismic cable from a vessel, comprising:
disposing one or more portable containers on a deck of the vessel;
winding the marine seismic cable around a winch;
storing the winch and the marine seismic cable disposed thereon inside one of the portable containers;
deploying the marine seismic cable from the winch to the sea; and
controlling the deployment using an overboard unit.

24. The method of claim 23, wherein the marine seismic cable is deployed automatically and supervised by one or more persons from a surveillance cabin on the vessel or a remote control on the deck.

25. The method of claim 23, wherein deploying the marine seismic cable comprises controlling tension on the marine seismic cable, an angle of the marine seismic cable with respect to a stern of the vessel, speed of deployment of the marine seismic cable, and how much marine seismic cable is deployed.

26. The method of claim 23, wherein the marine seismic cable is deployed at a rate of up to 3 m/s.

27. The method of claim 23, wherein the vessel is a vessel of opportunity.

28. The method of claim 23, wherein the overboard unit is disposed on the deck.

29. A method of deploying a marine seismic cable from a vessel, comprising:
disposing one or more portable containers on a deck of the vessel;
winding the marine seismic cable around a winch;
storing the winch and the marine seismic cable disposed thereon inside one of the portable containers;
deploying the marine seismic cable from the winch to the sea; and
controlling the deployment using an overboard unit, a cable tension machine and cable winches.

30. A system, comprising:
a vessel; and
a plurality of portable containers removably disposed on a deck of the vessel, wherein the portable containers comprise:
a winch;
a marine seismic cable wound around the winch;
a control system for variably controlling cable tension of the marine seismic cable on a seaside of the vessel; and
one or more marine seismic components for deploying and retrieving the marine seismic cable.

* * * * *